J. G. BAILEY.
HAY RACK.
APPLICATION FILED AUG. 26, 1909.
966,418.
Patented Aug. 9, 1910.
2 SHEETS—SHEET 2.
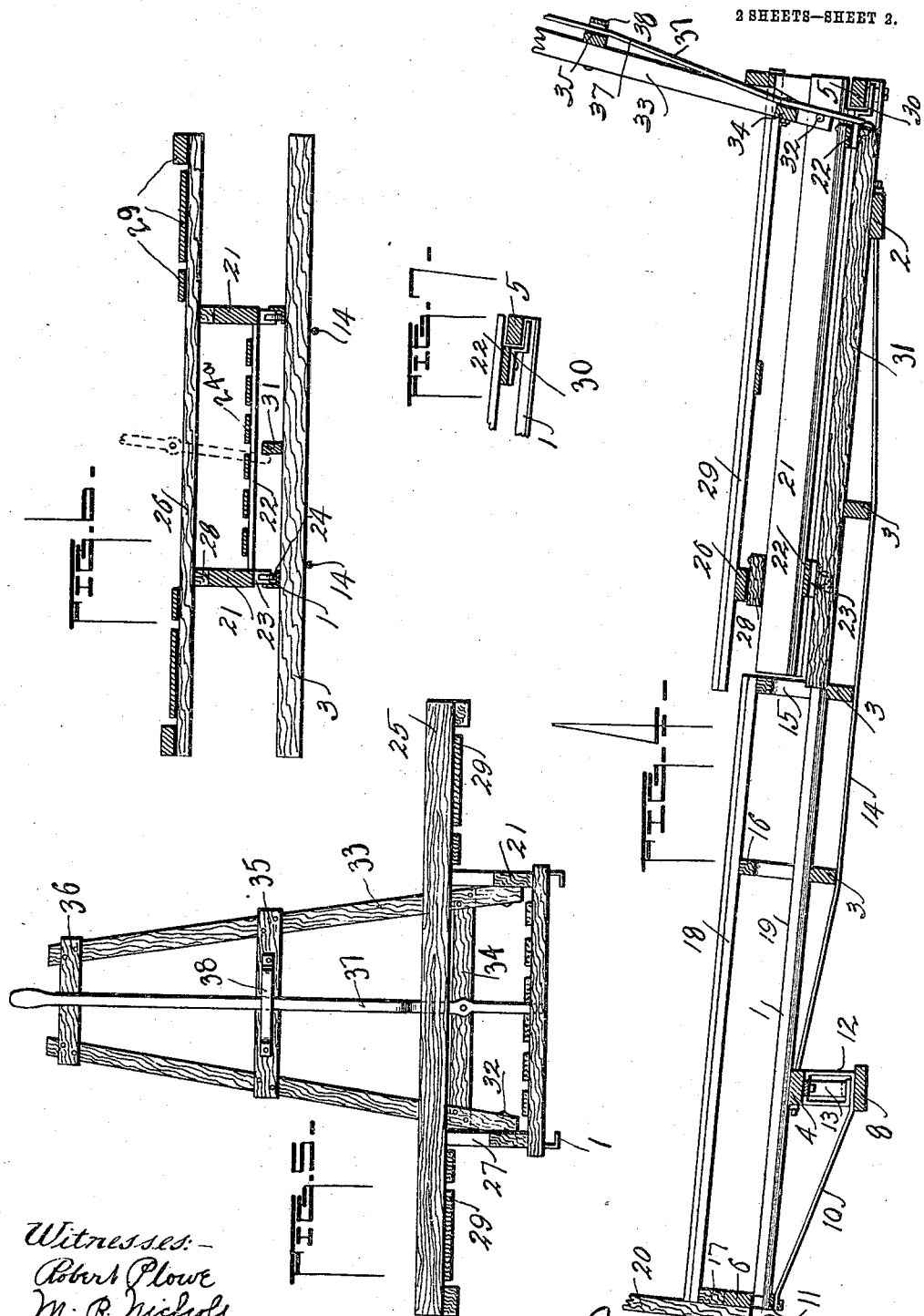

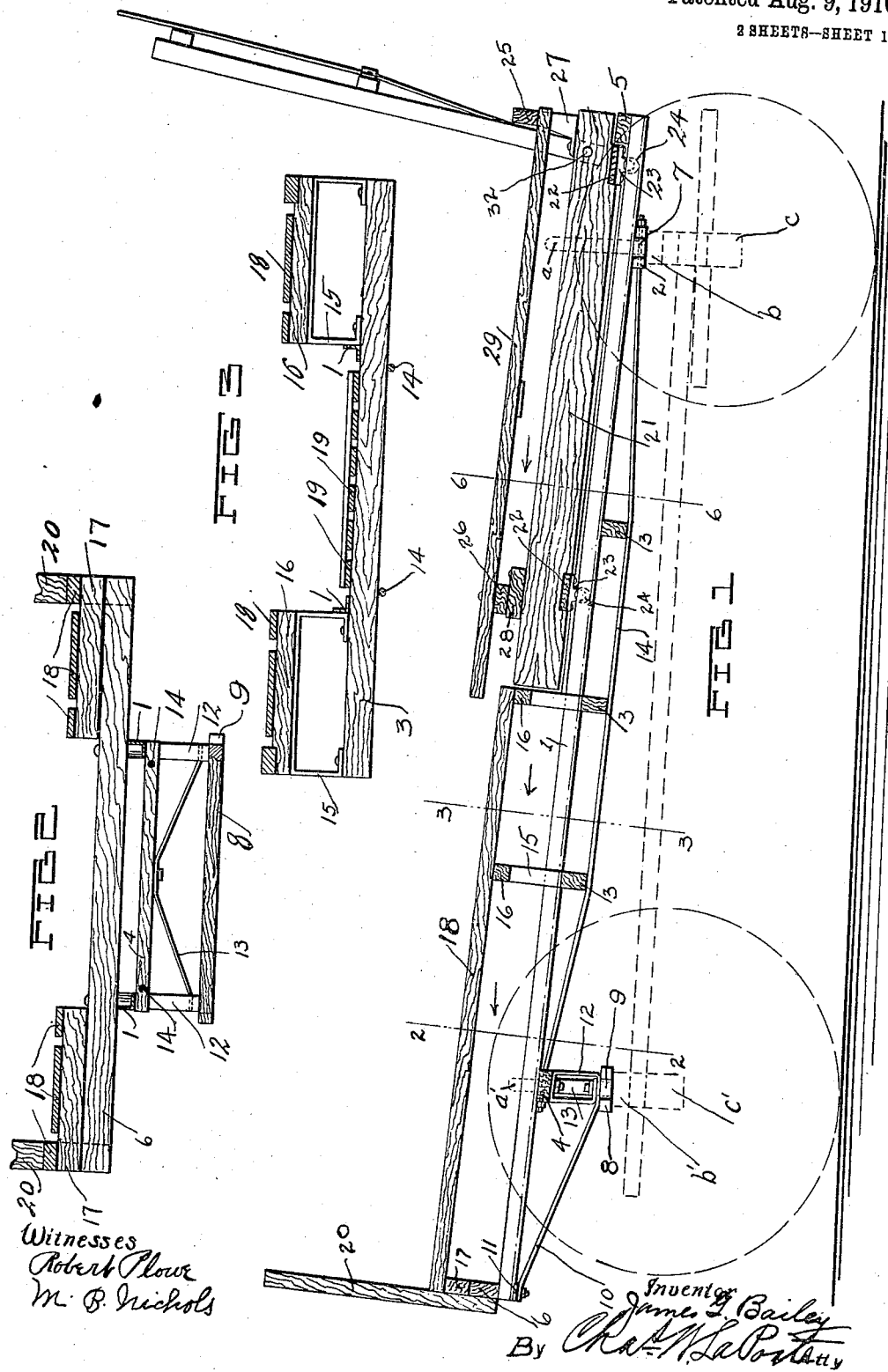

UNITED STATES PATENT OFFICE.

JAMES G. BAILEY, OF DELAVAN, ILLINOIS.

HAY-RACK.

966,418.  Specification of Letters Patent.  Patented Aug. 9, 1910.

Application filed August 26, 1909. Serial No. 514,754.

*To all whom it may concern:*

Be it known that I, JAMES G. BAILEY, a citizen of the United States, residing at Delavan, in the county of Tazewell and State of Illinois, have invented certain new and useful Improvements in Hay-Racks; and I do hereby declare that the following is a full, clear, and exact description of the invention, which will enable others skilled in the art to which it appertains to make and use the same.

This invention has reference to certain new and useful improvements in hay racks and relates particularly to that form of rack having a slidable section and a fixed section, said slidable section arranged to be moved longitudinally of the rack frame and above said fixed section.

One of the objects of the present invention is the doing away with all mechanically operated means for moving the slidable section after receiving its load, by constructing the rack frame so that by the action of gravity the slidable section will travel from a position above the fixed section to a position at the opposite end of said frame.

A further object of the invention is to combine in a hay rack a fixed and a movable section; the movable section adapted to be moved by the operator to a receiving position above the fixed section and locked in such position, and when properly loaded and after the locking means has been released, the movable rack section will travel without the aid of the operator or any mechanically operated means, to the opposite end of said frame.

The invention has for its further object a slidable section for a hay rack mounted to travel on an inclined frame, whereby it may be moved by the operator to a receiving position for receiving its load and after receiving its load to be moved by weight of gravity to the opposite end of said frame; a lever attached to said slidable section and adapted to coöperate with the opposite ends of a beam extending longitudinally of the frame for locking the slidable section at either end of the frame, and said lever arranged to coöperate or be brought into contact with the side of said beam to serve as a brake for retarding the return movement of the slidable section after receiving its load.

A further object of the invention is to simplify and improve the construction of a hay rack employing a fixed and a movable section and to construct said frame so that when the frame is attached to a running frame of a vehicle, the rear end of the frame will be elevated at a suitable point above the forward end so as to place the frame at an incline, whereby when the movable section has been loaded, it will return to the forward end of the frame by weight of gravity.

That the invention may be more fully understood, reference is had to the accompanying drawings forming a part of the specification, in which:—

Figure 1 is a side elevation of my improved hay rack, showing the movable section at the forward end of the frame and the frame supported on a running gear, the wheels of which and main parts of said gear, being shown in dotted lines; Fig. 2 is a cross-section as the same would appear if taken on the line 2—2 of Fig. 1 looking in the direction of the arrow on said figure; Fig. 3 is a cross-section as the same would appear if taken on the line 3—3 of Fig. 1 looking in the direction of the arrow on said figure; Fig. 4 is a longitudinal section of Fig. 1; Fig. 5 is an end elevation looking at the front end of Fig. 1; Fig. 6 is a cross-section as the same would appear on the line 6—6 of Fig. 1 looking in the direction of the arrow on said figure, and Fig. 7 is a detail illustrating a means which is employed for preventing the slidable section from tilting when it returns to the forward end of the frame.

Like characters of reference indicate corresponding parts throughout the figures.

The frame of the rack consists of the longitudinal angle iron beams 1 which are maintained throughout their length at suitable distances apart, by cross frame parts 2, 3, 3, 3, 4, 5 and 6. The cross frame 5 connects the forward ends of said angle iron beams and is disposed above the same. The cross frame part 2 is located at a suitable point in the rear of the forward ends of said angle iron beams 1, disposed beneath the same and at its opposite ends is formed with notches 7 in which may be seated the standards *a* which extend up from the bolster *b* supported on the front axle *c* of the running gear. The cross frames 3, 3, 3 are located at different points in the length of the angle iron beams 1, substantially as shown in Figs. 1 and 4 and preferably on the under side of said angle iron beams. The cross frame 4 is at a suitable point removed from the rear ends of the said angle iron beams 1 and located upon the lower sides thereof, and said frame 4 is suitably connected to and supported above a cross frame 8 which is similar to the cross frame 7, and has its opposite ends formed with notches 9 in which may be seated standards a' extending up from the rear bolster b' connected with the rear axle c' of the running gear. To elevate the cross frame 4 above the cross frame 8, I provide the skeleton frames which are in reality straps of iron 10 connected with the rear ends of the angle iron beams 1, by attaching the same to a cross strip 11 and then extending said straps 10 forwardly and downwardly and bending the inner ends to form rectangular open frames 12, to which the opposite ends of the cross frames 4 are bolted. For bracing this structure, a strap 13 is provided which is bolted or otherwise suitably secured centrally of the cross frame 4, as shown in Fig. 2, with the opposite ends secured to the lower portions of the rectangular frame 12, as shown in Figs. 1 and 2. The cross frame 6 connects the opposite ends of the angle iron beams 1 and is preferably disposed above the same. The frame, including the angle iron beams 1, the cross frames 2, 3, 3, 3 and 4, are braced by the stay rods 14 which extend longitudinally of the frame across and below the cross frames 3, 3, 3 and passing through the frames 2 and 4, as shown.

It is of course understood that the upper surfaces or faces of the front and rear bolsters of a running gear, are in the same horizontal plane, and this being the case, it is at once apparent that if the cross frames 2 and 8 were supported upon the front and rear bolsters, respectively, with the standards a and a', seated in the notched ends 7 and 9 of the cross frames 2 and 8, respectively, that the rear ends of the angle iron beams 1 would be supported or maintained at a suitable distance above the front ends of said angle iron beams, so that the frame of the rack is disposed at an incline, extending upwardly from the forward end of said frame. The purpose of this will be further explained.

The fixed rack section of the hay rack extends from a point approximately centrally disposed between the ends of the angle iron beams 1 to the rear ends of said beams, while the movable section is intended to cover the forward portions of said angle iron beams, from a point where the fixed rack section starts to the forward ends of said angle iron beams 1, and the construction of said movable rack section is such that it may be moved to the rear end of the frame so as to cover the fixed section, whereby the movable section is first loaded with hay and when so loaded, it is caused to be moved to the forward end of the frame when the fixed rack section may be loaded with hay. Such a construction simplifies the loading of a rack and does away with the unnecessary help which is necessary where the rack is all made of one section.

The fixed rack is supported from two of the cross frames 3 and the rear cross frame 6. Supported on two of the cross frames 3 and upon the outside of the angle iron frames 1 are brackets or suitable supports 15, which are preferably made from a strap of iron to both insure lightness in construction and yet have the necessary strength to support the frame parts. Attached to said supports 15, are the short transverse beams 16. To the opposite ends of the cross frame 6, see Fig. 2, are attached short beams 17, similar to the beams 16, and extending longitudinally of the frame and supported by the beams 16 and 17, is a plurality of boards 18 which form the outside portions of said fixed rack section, while the intermediate portions of said fixed rack section, consist of a plurality of boards 19 which extend longitudinally of the frame, and at their ends are secured to two of the cross frames 3 and the rear cross strip 11. The boards 18 and 19 form the flooring on which the hay is supported upon the fixed rack section, the boards 19, as will be understood, and clearly shown in the drawings, are disposed between the angle iron beams 1, while the boards 18 are elevated somewhat higher and located upon the outside of said angle iron beams 1. This construction of flooring for the rack resembles the usual and ordinary construction of hay rack and is such that the rack may be attached to a running gear using very high wheels. This idea is maintained throughout the entire rack and in connection with the slidable or movable section thereof. At the rear end of the fixed section and at the opposite ends of the cross frame 6 extend posts 20 serving as a partial inclosure for the hay after being pitched upon the fixed section of the rack.

The movable section of the rack is mounted to travel on wheels and the wheels move on the angle iron beams 1. The frame of the movable rack section consists of the longitudinal beams 21 connected at or near their front and rear ends by cross pieces 22, and to said cross pieces are secured brackets 23 which form bearings for rollers 24 movable upon the angle iron beams 1, in the manner shown. The center flooring for the movable rack section comprises the plurality of boards $24^a$, arranged substantially similar to the boards 19 on the fixed rack section, and yet adapted to travel above the same, and said boards $24^a$ are secured at their opposite ends to the cross pieces 22. The outside portions of the movable rack section, which have a flooring similar to the flooring consisting of the boards 18 for the fixed rack section, consist of the forward transverse cross frame 25 and the rear transverse cross frame 26. The cross frame 25 is supported on brackets 27 attached to the beams 21, whereas the cross frame 26 is attached to blocks 28, attached to the rear end of said beam 21. The flooring for the outside portion of said movable rack section, consists of the boards 29, which extend longitudinally of the movable rack section and are secured to the cross frame 25 beneath the same, and to the cross frame 26 above the same. It is intended that as the boards 24ᵃ forming the flooring for the movable rack section, are adapted to move lengthwise of and above the boards 19 of the fixed rack section, so do the boards 29 of said movable rack section, travel longitudinally of and above the boards 18 of said fixed rack section. When the movable rack section reaches and covers the forward portion of the frame for the rack, the cross piece 22 will engage with the cross frame 5, and stop the forward movement of said movable rack section, and to prevent any tilting of the said movable section after it has been returned to its forward position, I provide the cleats 30, see Figs. 4 and 5, attached to the lower side of the forward cross piece 22, and said cleats are bent in the manner shown, to extend beneath the cross frame 5, and when in such position, will prevent the said movable rack section from tilting.

I provide for locking the movable rack section in a position above the fixed rack section, and also after it has been returned to the forward end of the frame. The mechanism employed for this purpose consists of the longitudinal beam 31 which has its forward end resting upon and secured to the cross frame 2 intermediate the angle iron beams 1 and its rear end resting upon and secured to two of the cross frames 3. To the beams 21 at or near their forward ends, are pivotally connected at 32, uprights 33, which are connected or braced by the cross braces 34, 35 and 36, while pivotally connected to the cross brace 34 is a lever 37 which extends up above the upper ends of the uprights 33, and through a guide 38 on the cross brace 35 for maintaining the said lever in an operative position. The lower end of said lever 37 extends down to a suitable point where it may be moved to a point in front of the forward end of the beam 31 or to a point in front of the rear end of said beam, and when so placed, it will be apparent that the movable rack section cannot be moved in either direction until after said lever has been moved to one side or the other of either the forward or rear end of the beam 31, and that if desirable, when the movable rack section is moving from the rear to the forward end of the frame with a load of hay, the operator who may be upon the top of said load, may operate the lever for producing a frictional engagement between the lower end of the lever and the side of the beam 31 for retarding the return movement of said movable rack section. The frame consisting of the uprights 33 and the cross braces 34, 35 and 36 is thrown into the position shown in the figures, when loading hay upon the same, or said frame may be lowered when the rack is out of commission. To provide for the lower end of the lever 37 engaging with the ends of the beam 31, the two central boards 24ᵃ, forming the lower flooring of the movable rack, together with the cross piece 22, are suitably cut away to allow for carrying the lower end of the lever far enough down in the frame to engage the ends of said beam.

Having thus fully described my invention, what I claim and desire to secure by Letters Patent of the United States, is:—

1. In a hay rack, a supporting frame having its rear end raised at a suitable point above its front end so as to be normally disposed at an incline, a fixed rack section attached to the rear portion of said frame, and a movable rack section carried at the forward end of said frame, and capable of being moved longitudinally of and above said fixed rack section, the inclination of the supporting frame allowing the movable rack section to be moved from a point above the fixed rack section to the forward end of the frame by weight of gravity.

2. In a hay rack, a supporting frame having its rear end normally disposed higher than its forward end, a fixed rack section for the rear end of said frame, a movable rack section for the forward end of said frame, said movable rack section adapted to be moved longitudinally of and above said fixed rack section, a longitudinal beam supported in said frame, a lever carried by said movable rack section, said lever adapted to be moved into a position to engage either the forward end or the rear end of said longitudinal beam for the purpose of locking the said movable rack section at the forward end of said frame or above said fixed rack section.

3. In a hay rack, a supporting frame consisting of longitudinal frame parts, the cross frames 2, 3, and 4 connected with said longitudinal frame parts, truss-rods having their opposite ends connected with the frame parts 2 and 4 and bracing the frame parts 3 from beneath, the cross-frame part 8 spaced below the frame part 4, supporting means interposed between frame parts 4 and 8, a fixed rack section supported on one end of said longitudinal frame parts, and a movable rack section capable of being moved longitudinally of and above said fixed rack section.

4. In a hay rack, a supporting frame consisting of longitudinal frame parts, the cross-frames 2, 3 and 4 connected with said longitudinal frame parts, truss-rods having their opposite ends connected with the frame parts 2 and 4 and bracing the frame parts 3 from beneath, the cross-frame part 8 spaced below the frame part 4, supporting means interposed between frame parts 4 and 8, a fixed rack section supported above one end of said longitudinal frame parts, a movable rack section adapted to cover the opposite ends of said longitudinal frame parts and capable of being moved longitudinally of and above said fixed rack section, a lever carried by said movable section, and means with which the lever may be caused to engage for locking the movable rack section in two different positions.

5. In a hay rack, a supporting frame consisting of longitudinal frame parts, the cross-frames 2, 3 and 4 connected with said longitudinal frame parts, the opposite ends of the frame part 2 provided with notches, truss rods having their opposite ends connected with the frame parts 2 and 4 and bracing the frame parts 3 from beneath, the cross-frame part 8 spaced below the frame part 4 and provided with notches in its opposite ends, supporting means interposed between frame parts 4 and 8, brace rods between the frame part 8 and longitudinal frame parts, a fixed rack section supported on one end of said longitudinal frame parts, and a movable rack section capable of being moved longitudinally of and above said fixed rack section.

6. In a hay rack, a supporting frame including track sections normally supported at an incline, a fixed rack section for the rear end of said frame, a movable rack section for the forward end of said frame, the same having rollers movable on the track section, whereby the movable section may be moved to a point above said fixed section, a longitudinal beam supported in said frame, means carried on the movable section which may be caused to engage the opposite ends of the beam for locking the movable section, or caused to engage one side of the beam for frictionally retarding the movement of said movable section.

In testimony whereof I affix my signature, in presence of two witnesses.

JAMES G. BAILEY.

Witnesses:
   GEORGE W. FOCKLER,
   DANIEL M. BROWN.